US010754736B2

(12) United States Patent
Shani et al.

(10) Patent No.: US 10,754,736 B2
(45) Date of Patent: Aug. 25, 2020

(54) STORAGE SYSTEM WITH SCANNING AND RECOVERY OF INTERNAL HASH METADATA STRUCTURES

(71) Applicant: EMC IP Holding Company LLC, Hopkinton, MA (US)

(72) Inventors: Nimrod Shani, Herzliya (IL); Leron Fliess, Kiryat Ono (IL); Tal Zohar, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 170 days.

(21) Appl. No.: 16/170,361

(22) Filed: Oct. 25, 2018

(65) Prior Publication Data

US 2020/0133794 A1    Apr. 30, 2020

(51) Int. Cl.
*G06F 16/00* (2019.01)
*G06F 11/14* (2006.01)
(Continued)

(52) U.S. Cl.
CPC ...... *G06F 11/1469* (2013.01); *G06F 11/1464* (2013.01); *G06F 16/152* (2019.01);
(Continued)

(58) Field of Classification Search
CPC .................................................. G06F 16/152
See application file for complete search history.

(56) References Cited

U.S. PATENT DOCUMENTS 7,444,464 B2   10/2008 Urmston et al.
8,095,726 B1    1/2012 O'Connell et al.
(Continued)

FOREIGN PATENT DOCUMENTS

WO     2016111954 A1    7/2016

OTHER PUBLICATIONS

EMC Corporation, "Introduction to the EMC XtremIO Storage Array (Ver. 4.0): A Detailed Review," White Paper, Apr. 2015, 65 pages.

(Continued)

*Primary Examiner* — Ajith Jacob
(74) *Attorney, Agent, or Firm* — Ryan, Mason & Lewis, LLP

(57) ABSTRACT

A storage system in one embodiment comprises a plurality of storage devices and a storage controller. The storage controller is configured to scan data pages and associated metadata structures of the storage system, the metadata structures comprising at least a first metadata structure associating unique hash identifiers with physical locations of respective data pages in the storage system and a second metadata structure associating the physical locations of respective data pages with hash digests of the data pages and the unique hash identifiers. The storage controller is further configured to detect an error in one of the first and second metadata structures. Responsive to the detected error, the storage controller recovers a corresponding portion of the metadata based at least in part on one or more entries of the other one of the first and second metadata structures. The unique hash identifiers illustratively comprise respective shortened representations of the hash digests, such as hash handles uniquely corresponding to respective ones of the hash digests.

20 Claims, 7 Drawing Sheets

(51) Int. Cl.
  *G06F 16/22* (2019.01)
  *G06F 16/23* (2019.01)
  *G06F 16/14* (2019.01)

(52) U.S. Cl.
  CPC ...... *G06F 16/2255* (2019.01); *G06F 16/2365* (2019.01); *G06F 2201/84* (2013.01)

(56) References Cited

U.S. PATENT DOCUMENTS

| | | | |
|---|---|---|---|
| 8,214,612 | B1 | 7/2012 | Natanzon |
| 9,104,326 | B2 | 8/2015 | Frank et al. |
| 9,208,162 | B1 | 12/2015 | Hallak et al. |
| 9,286,003 | B1 | 3/2016 | Hallak et al. |
| 9,552,258 | B2 | 1/2017 | Hallak et al. |
| 9,606,870 | B1 | 3/2017 | Meiri et al. |
| 9,716,754 | B2 | 7/2017 | Swift |
| 2008/0279462 | A1 | 11/2008 | Celi, Jr. |
| 2009/0132955 | A1 | 5/2009 | Garg et al. |
| 2010/0179941 | A1 | 7/2010 | Agrawal et al. |
| 2013/0325824 | A1 | 12/2013 | Shoens |
| 2014/0046909 | A1* | 2/2014 | Patiejunas ........... G06F 11/1076 707/687 |
| 2014/0181016 | A1 | 6/2014 | Whitehead et al. |
| 2014/0344318 | A1* | 11/2014 | Vas .................. H04L 9/3271 707/827 |
| 2016/0150012 | A1 | 5/2016 | Barszczak et al. |
| 2016/0170987 | A1 | 6/2016 | Kesselman |
| 2016/0202927 | A1 | 7/2016 | Klarakis et al. |
| 2016/0224259 | A1 | 8/2016 | Ahrens et al. |
| 2017/0192857 | A1 | 7/2017 | Meiri et al. |

OTHER PUBLICATIONS

EMC Corporation, "Unstoppable Data Reduction: Always-on, In-Line, Zero-Penalty, Enterprise-Class, Free,"https://store.emc.com/xtremio, Jul. 2014, 2 pages.

EMC Corporation, "Introduction to XtremIO Virtual Copies," White Paper, Mar. 2016, 39 pages.

EMC Corporation, "XtremIO Data Production (XDP): Flash-Specific Data Protection, Provided by XtremIO (Ver. 4.0)," White Paper, Apr. 2015, 25 pages.

Dell EMC, "XtremIO v6.0 Specifications," Specification Sheet, 2017, 4 pages.

Dell EMC, "Dell EMC XtremIO X2: Next-Generation All-Flash Array," Data Sheet, 2017, 5 pages.

EMC Corporation, "High Availability, Data Protection and Data Integrity in the XtremIO Architecture," White Paper, Apr. 2015, 28 pages.

Y. Zhang et al., "End-to-End Integrity for File Systems: A ZFS Case Study," Proceedings of the 8th USENIX Conference on File and Storage Technologies (FAST), Feb. 23-26, 2010, 14 pages.

Dell EMC, "Introduction to Dell EMC XtremIO X2 Storage Array—A Detailed Review," Dell EMC White Paper, Aug. 2017, 46 pages.

N. Tolia et al., "Opportunistic Use of Content Addressable Storage for Distributed File Systems," Proceedings of the USENIX Annual Technical Conference, Jun. 9-14, 2003, 14 pages.

EMC Corporation, "EMC Recoverpoint Replication of XtremIO: Understanding the Essentials of RecoverPoint Snap-Based Replication for XtremIO," EMC White Paper, Aug. 2015, 31 pages.

Dell EMC, "Introduction to Dell EMC XtremIO X2 Storage Array—A Detailed Review," Dell EMC White Paper, Apr. 2018, 52 pages.

Dell EMC, "Introduction to XtremIO Metadata-Aware Replication," Dell EMC White Paper, Apr. 2018, 18 pages.

* cited by examiner

HASH METADATA (HMD) TABLE

| UNIQUE HASH ID 1 | REF COUNT 1 | PHYSICAL OFFSET OF DATA PAGE |
| UNIQUE HASH ID 2 | REF COUNT 2 | PHYSICAL OFFSET OF DATA PAGE |
| ... | | ... |
| UNIQUE HASH ID M | REF COUNT M | PHYSICAL OFFSET OF DATA PAGE |

TABLE KEY (UNIQUE HASH ID columns)

PHYSICAL LAYER BASED (PLB) TABLE

| PHYSICAL OFFSET 1 | HASH DIGEST OF DATA PAGE | UNIQUE HASH ID |
| PHYSICAL OFFSET 2 | HASH DIGEST OF DATA PAGE | UNIQUE HASH ID |
| ... | ... | ... |
| PHYSICAL OFFSET P | HASH DIGEST OF DATA PAGE | UNIQUE HASH ID |

TABLE KEY

STORAGE SYSTEM WITH SCANNING AND RECOVERY OF INTERNAL HASH METADATA STRUCTURES

FIELD

The field relates generally to information processing systems, and more particularly to storage in information processing systems.

BACKGROUND

Various types of content addressable storage systems are known. Some content addressable storage systems allow data pages of one or more logical storage volumes to be accessed using content-based signatures that are computed from content of respective ones of the data pages. Such content addressable storage system arrangements facilitate implementation of deduplication and compression. For example, the storage system need only maintain a single copy of a given data page even though that same data page may be part of multiple logical storage volumes. Although these and other content addressable storage systems typically provide a high level of storage efficiency through deduplication and compression, problems can arise when there is a loss of metadata that maps a logical storage space to a physical storage space in the content addressable storage system. Conventional log-based approaches typically used to support failure recovery in these and other situations can be limited in terms of their history, coverage and capacity and as a result often do not support a sufficiently high probability of recovery success.

SUMMARY

Illustrative embodiments provide storage systems that are configured for scanning and recovery of internal hash metadata structures. Such embodiments can be used to detect and correct errors in metadata structures without the need to rely on log-based approaches that are limited in their history, coverage and capacity and therefore their recovery success probability.

These embodiments illustratively include a clustered implementation of a content addressable storage system having a distributed storage controller. Similar advantages can be provided in other types of storage systems.

In one embodiment, a storage system comprises a plurality of storage devices and a storage controller. The storage controller is configured to scan data pages and associated metadata structures of the storage system, the metadata structures comprising at least a first metadata structure associating unique hash identifiers with physical locations of respective data pages in the storage system and a second metadata structure associating the physical locations of respective data pages with hash digests of the data pages and the unique hash identifiers. The storage controller is further configured to detect an error in one of the first and second metadata structures. Responsive to the detected error, the storage controller recovers a corresponding portion of the metadata based at least in part on one or more entries of the other one of the first and second metadata structures.

The unique hash identifiers illustratively comprise respective shortened representations of the hash digests, such as hash handles uniquely corresponding to respective ones of the hash digests. Other types of shortened representations of the hash digests can be used in other embodiments.

The first metadata structure illustratively comprises a first metadata table, the first metadata table comprising a plurality of entries accessible utilizing the unique hash identifiers as respective keys, with each such entry of the first metadata table comprising a corresponding one of the unique hash identifiers, a corresponding reference count and a corresponding physical offset of one of the data pages.

The second metadata structure illustratively comprises a second metadata table, the second metadata table comprising a plurality of entries accessible utilizing physical offsets of the physical locations as respective keys, with each such entry of the second metadata table comprising a corresponding one of the physical offsets, a corresponding one of the hash digests, and a corresponding one of the unique hash identifiers.

These are only examples, and other table configurations or metadata structures can be used in other embodiments.

In some embodiments, the storage controller is further configured to scan the data pages and metadata structures by identifying a range of data pages to be scanned, and for each of the data pages in the identified range, computing a hash digest of the page, utilizing the computed hash digest to identify a corresponding entry of the first metadata structure, executing a first comparison of an actual physical location of the page with the corresponding entry of the first metadata structure, and executing a second comparison of the computed hash digest of the page to a corresponding entry of the second metadata structure.

An error in the first metadata structure is indicated by an inconsistency between the actual physical location of the page and the corresponding entry of the first metadata structure in the first comparison.

An error in the second metadata structure is indicated by an inconsistency between the computed hash digest of the page and the corresponding entry of the second metadata structure in the second comparison.

Responsive to detection of an error in the first metadata structure, the corresponding entry of the first metadata structure is recovered at least in part by obtaining the unique hash identifier from the second metadata structure, and generating an updated entry based at least in part on the unique hash identifier.

Responsive to detection of an error in the second metadata structure, the corresponding entry of the second metadata structure is recovered at least in part by obtaining the unique hash identifier from the first metadata structure, and generating an updated entry based at least in part on the unique hash identifier and the computed hash digest.

The storage system in some embodiments comprises a content addressable storage system implemented utilizing non-volatile memory storage devices, such as flash-based storage devices. For example, the storage devices of the storage system in such embodiments can be configured to collectively provide an all-flash storage array. Numerous other storage system arrangements are possible in other embodiments.

These and other illustrative embodiments include, without limitation, apparatus, systems, methods and processor-readable storage media.

BRIEF DESCRIPTION OF THE DRAWINGS

FIGS. 4A and 4B show examples of internal hash metadata structures in an illustrative embodiment.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
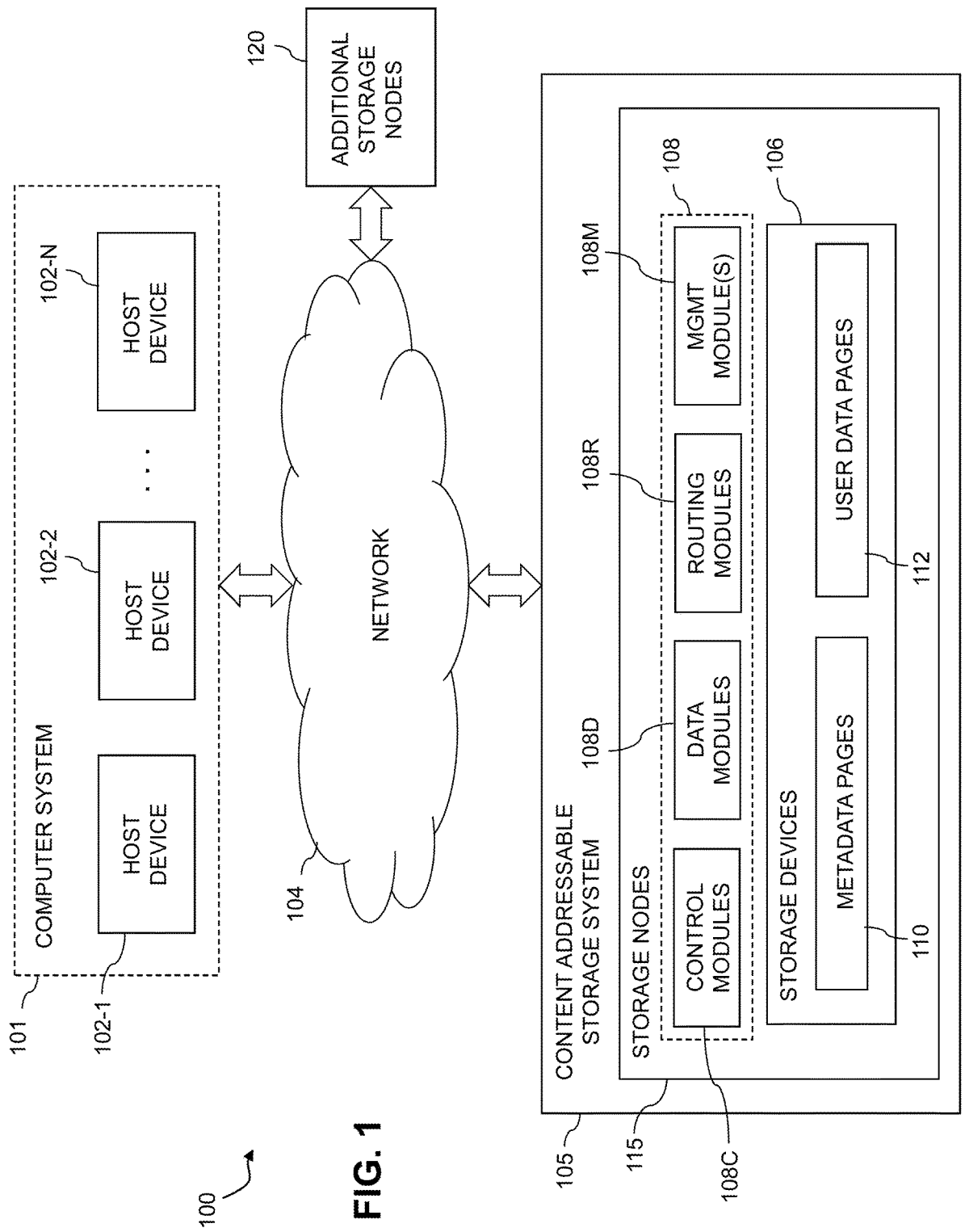
FIG. 1 is a block diagram of an information processing system comprising a content addressable storage system configured for scanning and recovery of internal hash metadata structures in an illustrative embodiment.

FIG. 1 shows an information processing system 100 configured in accordance with an illustrative embodiment. The information processing system 100 comprises a computer system 101 that includes host devices 102-1, 102-2, . . . 102-N. The host devices 102 communicate over a network 104 with a content addressable storage system 105. The content addressable storage system 105 is an example of what is more generally referred to herein as a "storage system," and it is to be appreciated that a wide variety of other types of storage systems can be used in other embodiments.

The host devices 102 and content addressable storage system 105 illustratively comprise respective processing devices of one or more processing platforms. For example, the host devices 102 and the content addressable storage system 105 can each comprise one or more processing devices each having a processor and a memory, possibly implementing virtual machines and/or containers, although numerous other configurations are possible.

The host devices 102 and content addressable storage system 105 may be part of an enterprise computing and storage system, a cloud-based system or another type of system. For example, the host devices 102 and the content addressable storage system 105 can be part of cloud infrastructure such as an Amazon Web Services (AWS) system. Other examples of cloud-based systems that can be used to provide one or more of host devices 102 and content addressable storage system 105 include Google Cloud Platform (GCP) and Microsoft Azure.

The host devices 102 are configured to write data to and read data from the content addressable storage system 105.

The host devices 102 and the content addressable storage system 105 may be implemented on a common processing platform, or on separate processing platforms. A wide variety of other types of host devices can be used in other embodiments.

The host devices 102 in some embodiments illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities. Compute and/or storage services may be provided for users under a platform-as-a-service (PaaS) model, an infrastructure-as-a-service (IaaS) model and/or a function-as-a-service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The content addressable storage system 105 is accessible to the host devices 102 over the network 104. The content addressable storage system 105 comprises a plurality of storage devices 106 and an associated storage controller 108. The storage devices 106 illustratively store metadata pages 110 and user data pages 112. The user data pages 112 in some embodiments are organized into sets of logical units (LUNs) each accessible to one or more of the host devices 102. The LUNs may be viewed as examples of what are also referred to herein as logical storage volumes of the content addressable storage system 105.

The storage devices 106 illustratively comprise solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices may also be used.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises hard disk drives. The particular storage devices used in a given storage tier may be varied in other embodiments, and multiple distinct storage device types may be used within a single storage tier. The term "storage device" as used herein is intended to be broadly construed, so as to encompass, for example, flash drives, solid state drives, hard disk drives, hybrid drives or other types of storage devices.

In some embodiments, the content addressable storage system 105 illustratively comprises a scale-out all-flash content addressable storage array such as an XtremIO™ storage array from Dell EMC of Hopkinton, Mass. For example, the content addressable storage system 105 can comprise an otherwise conventional XtremIO™ storage array or other type of content addressable storage system that is suitably modified to incorporate scanning and recovery of internal hash metadata structures as disclosed herein. Other types of storage arrays, including by way of example VNX® and Symmetrix VMAX® storage arrays also from Dell EMC, can be used to implement content addressable storage system 105 in other embodiments.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing content addressable storage system 105 in illustrative embodiments include all-flash and hybrid flash storage arrays such as Unity™, software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

The content addressable storage system 105 in the FIG. 1 embodiment is implemented as at least a portion of a clustered storage system and includes a plurality of storage nodes 115 each comprising a corresponding subset of the storage devices 106. Other clustered storage system arrangements comprising multiple storage nodes can be used in other embodiments. A given clustered storage system may include not only storage nodes 115 but also additional storage nodes 120 coupled to network 104. Alternatively, such additional storage nodes 120 may be part of another clustered storage system of the system 100. Each of the storage nodes 115 of the content addressable storage system 105 is assumed to be implemented using at least one processing device comprising a processor coupled to a memory.

Other arrangements of storage nodes or other types of nodes can be used. The term "node" as used herein is intended to be broadly construed and a given such node need not include storage devices.

The storage controller 108 in this embodiment is implemented in a distributed manner so as to comprise a plurality of distributed storage controller components implemented on respective ones of the storage nodes 115. The storage controller 108 is therefore an example of what is more generally referred to herein as a "distributed storage controller." Accordingly, in subsequent description herein, the storage controller 108 is more particularly referred to as a distributed storage controller. Other types of potentially non-distributed storage controllers can be used in other embodiments.

Each of the storage nodes 115 in this embodiment further comprises a set of processing modules configured to communicate over one or more networks with corresponding sets of processing modules on other ones of the storage nodes 115. The sets of processing modules of the storage nodes 115 collectively comprise at least a portion of the distributed storage controller 108 of the content addressable storage system 105.

The modules of the distributed storage controller 108 in the present embodiment more particularly comprise different sets of processing modules implemented on each of the storage nodes 115. The set of processing modules of each of the storage nodes 115 comprises at least a control module 108C, a data module 108D and a routing module 108R. The distributed storage controller 108 further comprises one or more management ("MGMT") modules 108M. For example, only a single one of the storage nodes 115 may include a management module 108M. It is also possible that management modules 108M may be implemented on each of at least a subset of the storage nodes 115.

Each of the storage nodes 115 of the content addressable storage system 105 therefore comprises a set of processing modules configured to communicate over one or more networks with corresponding sets of processing modules on other ones of the storage nodes. A given such set of processing modules implemented on a particular storage node illustratively includes at least one control module 108C, at least one data module 108D and at least one routing module 108R, and possibly a management module 108M. These sets of processing modules of the storage nodes collectively comprise at least a portion of the distributed storage controller 108.

Communication links may be established between the various processing modules of the distributed storage controller 108 using well-known communication protocols such as IP, Transmission Control Protocol (TCP), and remote direct memory access (RDMA). For example, respective sets of IP links used in data transfer and corresponding messaging could be associated with respective different ones of the routing modules 108R.

It is assumed in some embodiments that the processing modules of the distributed storage controller 108 are interconnected in a full mesh network, such that a process of one of the processing modules can communicate with processes of any of the other processing modules. Commands issued by the processes can include, for example, remote procedure calls (RPCs) directed to other ones of the processes.

The distributed storage controller 108 of the content addressable storage system 105 in the present embodiment is configured to control the implementation of functionality for scanning and recovery of internal hash metadata structures as disclosed herein. The distributed storage controller 108 is assumed to comprise a type of "processing device" as that term is broadly used herein, and more particularly comprises at least one processor coupled to a memory.

As part of the scanning and recovery of internal hash metadata structures, the distributed storage controller 108 in the present embodiment is configured to scan data pages and associated metadata structures of the content addressable storage system 105. The metadata structures more particularly comprise at least a first metadata structure associating unique hash identifiers with physical locations of respective data pages in the content addressable storage system 105, and a second metadata structure associating the physical locations of respective data pages with hash digests of the data pages and the unique hash identifiers.

The first metadata structure in some embodiments more particularly comprises a first metadata table. The first metadata table comprises a plurality of entries accessible utilizing the unique hash identifiers as respective keys, with each such entry of the first metadata table comprising a corresponding one of the unique hash identifiers, a corresponding reference count and a corresponding physical offset of one of the data pages.

A more specific example of the first metadata table in illustrative embodiments disclosed herein is also referred to as a hash metadata ("HMD") table. One possible implementation of an HMD table is shown in FIG. 4A and will be described in more detail below in conjunction with the flow diagram of FIG. 3.

The second metadata structure in some embodiments more particularly comprises a second metadata table. The second metadata table comprises a plurality of entries accessible utilizing physical offsets of the physical locations as respective keys, with each such entry of the second metadata table comprising a corresponding one of the physical offsets, a corresponding one of the hash digests, and a corresponding one of the unique hash identifiers.

A more specific example of the second metadata table in illustrative embodiments disclosed herein is also referred to as a physical layer based ("PLB") table. One possible implementation of a PLB table is shown in FIG. 4B and will also be described in more detail below in conjunction with the flow diagram of FIG. 3.

The distributed storage controller 108 can initiate the scanning of the data pages and the metadata structures responsive to a metadata loss event, or under any of a wide variety of other conditions. For example, the scanning of the data pages and the metadata structures can be performed periodically, or otherwise in accordance with a maintenance schedule of the content addressable storage system 105. The particular data pages subject to a given instance of a scanning and recovery process performed under the control of the distributed storage controller 108 can comprise, for example, a designated range of data pages. The designated range of data pages can comprise in some cases all of the data pages of the content addressable storage system 105, or a subset of the data pages. Different instances of the scanning and recovery process can be performed for respective different ranges of the data pages.

The distributed storage controller 108 in the present embodiment is configured to detect an error in one of the first and second metadata structures, and responsive to the detected error, to recover a corresponding portion of the metadata based at least in part on one or more entries of the other one of the first and second metadata structures. For example, if there is an error detected in the HMD table, the corresponding portion of the metadata that is in error is recovered using one or more entries of the PLB table. Similarly, if there is an error detected in the PLB table, the corresponding portion of the metadata that is in error is recovered using one or more entries of the HMD table.

In some embodiments, the data page itself and a hash digest computed therefrom are additionally used in recovering the corresponding portion of the metadata responsive to the detected error.

The hash digests are computed by applying a secure hashing algorithm such as SHA1 to content of the respective data pages. The hash digests are illustratively full hash digests of the respective data pages, and are an example of what are also referred to herein as "content-based signatures" of the data pages.

The unique hash identifiers are generally shorter in length than the corresponding hash digests of the respective data pages, and each illustratively provides a unique short representation of the corresponding full hash digest. For example, the unique hash identifiers may comprise respective "hash handles" of the data pages with the hash handles uniquely corresponding to respective ones of the hash digests. Additional details regarding hash digests and hash handles are provided elsewhere herein.

The distributed storage controller 108 in some embodiments scans the data pages and the metadata structures by identifying a range of data pages to be scanned, and for each of the data pages in the identified range, computing a hash digest of the page, utilizing the computed hash digest to identify a corresponding entry of the first metadata structure, executing a first comparison of an actual physical location of the page with the corresponding entry of the first metadata structure, and executing a second comparison of the computed hash digest of the page to a corresponding entry of the second metadata structure.

An error in the first metadata structure is indicated by an inconsistency between the actual physical location of the page and the corresponding entry of the first metadata structure in the first comparison.

An error in the second metadata structure is indicated by an inconsistency between the computed hash digest of the page and the corresponding entry of the second metadata structure in the second comparison.

Other types of inconsistencies or other errors in one or more entries of one of the first and second metadata structures can be detected in other embodiments.

Responsive to detection of an error in the first metadata structure, the corresponding entry of the first metadata structure is recovered at least in part by obtaining the unique hash identifier from the second metadata structure, and generating an updated entry based at least in part on the unique hash identifier.

Responsive to detection of an error in the second metadata structure, the corresponding entry of the second metadata structure is recovered at least in part by obtaining the unique hash identifier from the first metadata structure, and generating an updated entry based at least in part on the unique hash identifier and the computed hash digest.

These particular recovery operations are also just examples, and additional or alternative recovery operations can be performed in other embodiments.

Various aspects of page storage in the content addressable storage system 105 will now be described in greater detail. As indicated above, the storage devices 106 are configured to store metadata pages 110 and user data pages 112, and in some embodiments may also store additional information not explicitly shown such as checkpoints and write journals. The metadata pages 110 and the user data pages 112 are illustratively stored in respective designated metadata and user data areas of the storage devices 106. Accordingly, metadata pages 110 and user data pages 112 may be viewed as corresponding to respective designated metadata and user data areas of the storage devices 106.

The term "page" as used herein is intended to be broadly construed so as to encompass any of a wide variety of different types of blocks that may be utilized in a block storage device of a storage system. Such storage systems are not limited to content addressable storage systems of the type disclosed in some embodiments herein, but are more generally applicable to any storage system that includes one or more block storage devices. Different native page sizes are generally utilized in different storage systems of different types. For example, XtremIO™ X1 storage arrays utilize a native page size of 8 KB, while XtremIO™ X2 storage arrays utilize a native page size of 16 KB. Larger native page sizes of 64 KB and 128 KB are utilized in VMAX® V2 and VMAX® V3 storage arrays, respectively. The native page size generally refers to a typical page size at which the storage system ordinarily operates, although it is possible that some storage systems may support multiple distinct page sizes as a configurable parameter of the system. Each such page size of a given storage system may be considered a "native page size" of the storage system as that term is broadly used herein.

A given "page" as the term is broadly used herein should therefore not be viewed as being limited to any particular range of fixed sizes. In some embodiments, a page size of 8 KB is used, but this is by way of example only and can be varied in other embodiments. For example, page sizes of 4 KB, 16 KB or other values can be used. Accordingly, illustrative embodiments can utilize any of a wide variety of alternative paging arrangements for organizing the metadata pages 110 and the user data pages 112.

The user data pages 112 are part of a plurality of LUNs configured to store files, blocks, objects or other arrangements of data, each also generally referred to herein as a "data item," on behalf of users associated with host devices 102. Each such LUN may comprise particular ones of the above-noted pages of the user data area. The user data stored in the user data pages 112 can include any type of user data that may be utilized in the system 100. The term "user data" herein is therefore also intended to be broadly construed.

The content addressable storage system 105 is configured to generate hash metadata providing a mapping between content-based digests of respective ones of the user data pages 112 and corresponding physical locations of those pages in the user data area. Content-based digests generated using hash functions are also referred to herein as "hash digests." Such hash digests or other types of content-based digests are examples of what are more generally referred to herein as "content-based signatures" of the respective user data pages 112. The hash metadata generated by the content addressable storage system 105 is illustratively stored as metadata pages 110 in the metadata area. The generation and storage of the hash metadata is assumed to be performed under the control of the distributed storage controller 108.

Each of the metadata pages 110 characterizes a plurality of the user data pages 112. For example, a given set of user data pages representing a portion of the user data pages 112 illustratively comprises a plurality of user data pages denoted User Data Page 1, User Data Page 2, . . . User Data Page n.

Each of the user data pages 112 in this example is characterized by a LUN identifier, an offset and a content-based signature. The content-based signature is generated as a hash function of content of the corresponding user data page. Illustrative hash functions that may be used to generate the content-based signature include the SHA1 hash function, where SHA denotes Secure Hashing Algorithm, or other secure hashing algorithms known to those skilled in the art, including SHA2, SHA256 and many others. The content-based signature is utilized to determine the location of the corresponding user data page within the user data area of the storage devices 106.

Each of the metadata pages 110 in the present embodiment is assumed to have a signature that is not content-based. For example, the metadata page signatures may be generated using hash functions or other signature generation algorithms that do not utilize content of the metadata pages as input to the signature generation algorithm. Also, each of the metadata pages is assumed to characterize a different set of the user data pages.

A given set of metadata pages representing a portion of the metadata pages 110 in an illustrative embodiment comprises metadata pages denoted Metadata Page 1, Metadata Page 2, . . . Metadata Page m, having respective signatures denoted Signature 1, Signature 2, . . . Signature m. Each such metadata page characterizes a different set of n user data pages. For example, the characterizing information in each metadata page can include the LUN identifiers, offsets and content-based signatures for each of the n user data pages that are characterized by that metadata page. It is to be appreciated, however, that the user data and metadata page configurations described above are examples only, and numerous alternative user data and metadata page configurations can be used in other embodiments.

Ownership of a user data logical address space within the content addressable storage system 105 is illustratively distributed among the control modules 108C.

The functionality for scanning and recovery of internal hash metadata structures in this embodiment is assumed to be distributed across multiple distributed processing modules, including at least a subset of the processing modules 108C, 108D, 108R and 108M of the distributed storage controller 108.

For example, the management module 108M of the distributed storage controller 108 may include scanning and recovery control logic that engages or otherwise interacts with corresponding control logic instances in at least a subset of the control modules 108C, data modules 108D and routing modules 108R in order to implement scanning and recovery of internal hash metadata structures.

In some embodiments, the content addressable storage system 105 comprises an XtremIO™ storage array suitably modified to incorporate techniques for scanning and recovery of internal hash metadata structures as disclosed herein.

In arrangements of this type, the control modules 108C, data modules 108D and routing modules 108R of the distributed storage controller 108 illustratively comprise respective C-modules, D-modules and R-modules of the XtremIO™ storage array. The one or more management modules 108M of the distributed storage controller 108 in such arrangements illustratively comprise a system-wide management module ("SYM module") of the XtremIO™ storage array, although other types and arrangements of system-wide management modules can be used in other embodiments. Accordingly, functionality for scanning and recovery of internal hash metadata structures in some embodiments is implemented under the control of at least one system-wide management module of the distributed storage controller 108, utilizing the C-modules, D-modules and R-modules of the XtremIO™ storage array.

In the above-described XtremIO™ storage array example, each user data page has a fixed size such as 8 KB and its content-based signature is a 20-byte signature generated using an SHA1 hash function. Also, each page has a LUN identifier and an offset, and so is characterized by <lun_id, offset, signature>.

The content-based signature in the present example comprises a content-based digest of the corresponding data page. Such a content-based digest is more particularly referred to as a "hash digest" of the corresponding data page, as the content-based signature is illustratively generated by applying a hash function such as SHA1 to the content of that data page. The full hash digest of a given data page is given by the above-noted 20-byte signature. The hash digest may be represented by a corresponding "hash handle," which in some cases may comprise a particular portion of the hash digest. The hash handle illustratively maps on a one-to-one basis to the corresponding full hash digest within a designated cluster boundary or other specified storage resource boundary of a given storage system. In arrangements of this type, the hash handle provides a lightweight mechanism for uniquely identifying the corresponding full hash digest and its associated data page within the specified storage resource boundary. The hash digest and hash handle are both considered examples of "content-based signatures" as that term is broadly used herein.

Examples of techniques for generating and processing hash handles for respective hash digests of respective data pages are disclosed in U.S. Pat. No. 9,208,162, entitled "Generating a Short Hash Handle," and U.S. Pat. No. 9,286,003, entitled "Method and Apparatus for Creating a Short Hash Handle Highly Correlated with a Globally-Unique Hash Signature," both of which are incorporated by reference herein.

As mentioned previously, storage controller components in an XtremIO™ storage array illustratively include C-module, D-module and R-module components. For example, separate instances of such components can be associated with each of a plurality of storage nodes in a clustered storage system implementation.

The distributed storage controller 108 in this example is configured to group consecutive pages into page groups, to arrange the page groups into slices, and to assign the slices to different ones of the C-modules. For example, if there are 1024 slices distributed evenly across the C-modules, and there are a total of 16 C-modules in a given implementation, each of the C-modules "owns" 1024/16=64 slices. In such arrangements, different ones of the slices are assigned to different ones of the control modules 108C such that control of the slices within the distributed storage controller 108 is substantially evenly distributed over the control modules 108C of the distributed storage controller 108.

The D-module allows a user to locate a given user data page based on its signature. Each metadata page also has a size of 8 KB and includes multiple instances of the <lun_id, offset, signature> for respective ones of a plurality of the user data pages. Such metadata pages are illustratively generated by the C-module but are accessed using the D-module based on a metadata page signature.

The metadata page signature in this embodiment is a 20-byte signature but is not based on the content of the metadata page. Instead, the metadata page signature is generated based on an 8-byte metadata page identifier that is a function of the LUN identifier and offset information of that metadata page.

If a user wants to read a user data page having a particular LUN identifier and offset, the corresponding metadata page identifier is first determined, then the metadata page signature is computed for the identified metadata page, and then the metadata page is read using the computed signature. In this embodiment, the metadata page signature is more particularly computed using a signature generation algorithm that generates the signature to include a hash of the 8-byte metadata page identifier, one or more ASCII codes for particular predetermined characters, as well as possible additional fields. The last bit of the metadata page signature may always be set to a particular logic value so as to distinguish it from the user data page signature in which the last bit may always be set to the opposite logic value.

The metadata page signature is used to retrieve the metadata page via the D-module. This metadata page will include the <lun_id, offset, signature> for the user data page if the user page exists. The signature of the user data page is then used to retrieve that user data page, also via the D-module.

Write requests processed in the content addressable storage system 105 each illustratively comprise one or more IO operations directing that at least one data item of the content addressable storage system 105 be written to in a particular manner. A given write request is illustratively received in the content addressable storage system 105 from a host device, illustratively one of the host devices 102. In some embodiments, a write request is received in the distributed storage controller 108 of the content addressable storage system 105, and directed from one processing module to another processing module of the distributed storage controller 108. For example, a received write request may be directed from a routing module 108R of the distributed storage controller 108 to a particular control module 108C of the distributed storage controller 108. Other arrangements for receiving and processing write requests from one or more host devices can be used.

The term "write request" as used herein is intended to be broadly construed, so as to encompass one or more IO operations directing that at least one data item of a storage system be written to in a particular manner. A given write request is illustratively received in a storage system from a host device.

In the XtremIO™ context, the C-modules, D-modules and R-modules of the storage nodes 115 communicate with one another over a high-speed internal network such as an InfiniBand network. The C-modules, D-modules and R-modules coordinate with one another to accomplish various IO processing tasks.

The write requests from the host devices 102 identify particular data pages to be written in the content addressable storage system 105 by their corresponding logical addresses each comprising a LUN ID and an offset.

As noted above, a given one of the content-based signatures illustratively comprises a hash digest of the corresponding data page, with the hash digest being generated by applying a hash function to the content of that data page. The hash digest may be uniquely represented within a given storage resource boundary by a corresponding hash handle.

The content addressable storage system 105 utilizes a two-level mapping process to map logical block addresses to physical block addresses. The first level of mapping uses an address-to-hash ("A2H") table and the second level of mapping uses a hash metadata ("HMD") table, with the A2H and HMD tables corresponding to respective logical and physical layers of the content-based signature mapping within the content addressable storage system 105. The HMD table or a given portion thereof in some embodiments disclosed herein is more particularly referred to as a hash-to-data ("H2D") table.

The first level of mapping using the A2H table associates logical addresses of respective data pages with respective content-based signatures of those data pages. This is also referred to as logical layer mapping.

The second level of mapping using the HMD table associates respective ones of the content-based signatures with respective physical storage locations in one or more of the storage devices 106. This is also referred to as physical layer mapping.

Additional metadata structures, such as the previously-described PLB table, are utilized in conjunction with the HMD table in illustrative embodiments. As mentioned above, examples of HMD and PLB tables are shown in FIGS. 4A and 4B of the figures.

For a given write request, both of the corresponding HMD and A2H tables are updated in conjunction with the processing of that write request.

The A2H and HMD tables described above are examples of what are more generally referred to herein as "mapping tables" of respective first and second distinct types. Other types and arrangements of mapping tables or other content-based signature mapping information may be used in other embodiments.

Such mapping tables are still more generally referred to herein as "metadata structures" of the content addressable storage system 105. It should be noted that additional or alternative metadata structures can be used in other embodiments. References herein to particular tables of particular types, such as A2H, HMD and PLB tables, and their respective configurations, should be considered non-limiting and are presented by way of illustrative example only.

The logical block addresses or LBAs of a logical layer of the content addressable storage system 105 correspond to respective physical blocks of a physical layer of the content addressable storage system 105. The user data pages of the logical layer are organized by LBA and have reference via respective content-based signatures to particular physical blocks of the physical layer.

Each of the physical blocks has an associated reference count that is maintained within the content addressable storage system 105. The reference count for a given physical block indicates the number of logical blocks that point to that same physical block.

In releasing logical address space in the storage system, a dereferencing operation is generally executed for each of the LBAs being released. More particularly, the reference count of the corresponding physical block is decremented. A reference count of zero indicates that there are no longer any logical blocks that reference the corresponding physical block, and so that physical block can be released.

It should also be understood that the particular arrangement of storage controller processing modules 108C, 108D, 108R and 108M as shown in the FIG. 1 embodiment is presented by way of example only. Numerous alternative arrangements of processing modules of a distributed storage controller may be used to implement functionality for scanning and recovery of internal hash metadata structures in a clustered storage system in other embodiments.

Additional examples of content addressable storage functionality implemented in some embodiments by control modules 108C, data modules 108D, routing modules 108R and management module(s) 108M of distributed storage controller 108 can be found in U.S. Pat. No. 9,104,326, entitled "Scalable Block Data Storage Using Content Addressing," which is incorporated by reference herein. Alternative arrangements of these and other storage node processing modules of a distributed storage controller in a content addressable storage system can be used in other embodiments.

As indicated previously, the host devices 102 and content addressable storage system 105 in the FIG. 1 embodiment are assumed to be implemented using at least one processing platform each comprising one or more processing devices each having a processor coupled to a memory. Such processing devices can illustratively include particular arrangements of compute, storage and network resources.

The host devices 102 and the content addressable storage system 105 may be implemented on respective distinct processing platforms, although numerous other arrangements are possible. For example, in some embodiments at least portions of the host devices 102 and the content addressable storage system 105 are implemented on the same processing platform. The content addressable storage system 105 can therefore be implemented at least in part within at least one processing platform that implements at least a one of the host devices 102.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the host devices 102 and the content addressable storage system 105 to reside in different data centers. Numerous other distributed implementations of the host devices 102 and/or the content addressable storage system 105 are possible. Accordingly, the content addressable storage system 105 can also be implemented in a distributed manner across multiple data centers.

Additional examples of processing platforms utilized to implement host devices and/or storage systems in illustrative embodiments will be described in more detail below in conjunction with FIGS. 5 and 6.

It is to be appreciated that these and other features of illustrative embodiments are presented by way of example only, and should not be construed as limiting in any way.

Accordingly, different numbers, types and arrangements of system components such as host devices 102, network 104, content addressable storage system 105, storage devices 106, storage controllers 108 and storage nodes 115 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, in some embodiments, at least portions of the functionality for scanning and recovery of internal hash metadata structures as disclosed herein can be implemented in a host device, in a storage system, or partially in a host device and partially in a storage system.

Illustrative embodiments are therefore not limited to arrangements in which all such functionality is implemented in a host device or a storage system, and therefore encompass various hybrid arrangements in which the functionality is distributed over one or more host devices and one or more storage systems, each comprising one or more processing devices.

Figure 2:
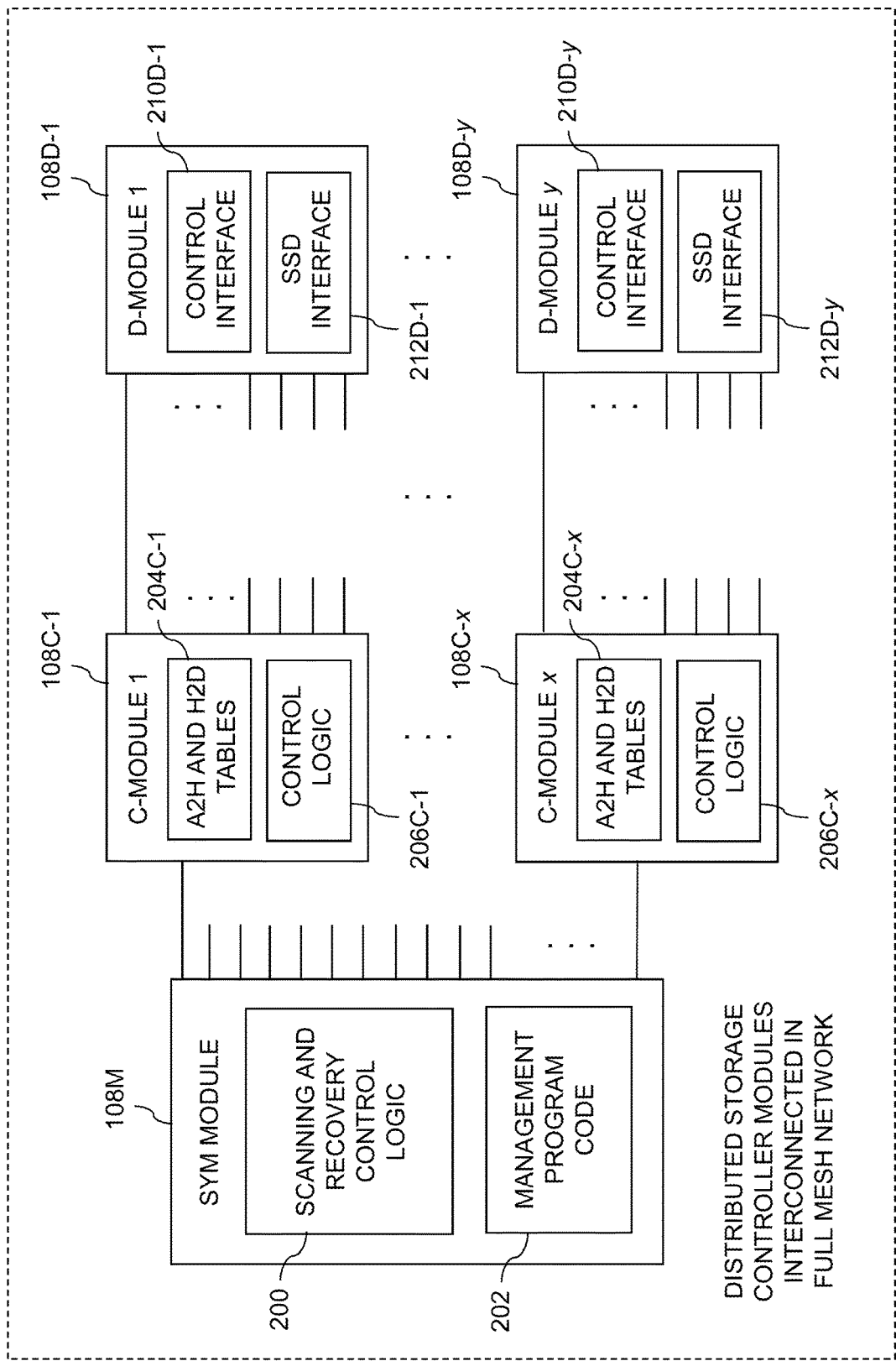
FIG. 2 illustrates a portion of a distributed storage controller of a content addressable storage system showing one possible arrangement utilizing control modules and data modules interconnected by a mesh network and configured for scanning and recovery of internal hash metadata structures in an illustrative embodiment.

Referring now to FIG. 2, a more detailed view of a portion of the distributed storage controller 108 in an illustrative embodiment is shown. This embodiment illustrates an example arrangement of control modules 108C, data modules 108D and a management module 108M of the distributed storage controller 108. It is assumed in this embodiment that these and possibly other modules of the distributed storage controller 108 are interconnected in a full mesh network, such that each of the modules can communicate with each of the other modules, although other types of networks and different module interconnection arrangements can be used in other embodiments.

The management module 108M of the distributed storage controller 108 in this embodiment more particularly comprises a system-wide management module or SYM module of the type mentioned previously. Although only a single SYM module is shown in this embodiment, other embodiments can include multiple instances of the SYM module possibly implemented on different ones of the storage nodes. It is therefore assumed that the distributed storage controller 108 comprises one or more management modules 108M.

A given instance of management module 108M comprises scanning and recovery control logic 200 and associated management program code 202. The management module 108M communicates with control modules 108C-1 through 108C-x, also denoted as C-module 1 through C-module x. The control modules 108C communicate with data modules 108D-1 through 108D-y, also denoted as D-module 1 through D-module y. The variables x and y are arbitrary integers greater than one, and may but need not be equal. In some embodiments, each of the storage nodes 115 of the content addressable storage system 105 comprises one of the control modules 108C and one of the data modules 108D, as well as one or more additional modules including one of the routing modules 108R. A wide variety of alternative configurations of nodes and processing modules are possible in other embodiments. Also, the term "storage node" as used herein is intended to be broadly construed, and may comprise a node that implements storage control functionality but does not necessarily incorporate storage devices.

The control modules 108C-1 through 108C-x in the FIG. 2 embodiment comprise respective sets of A2H and H2D tables 204C-1 through 204C-x. The A2H tables are utilized to store address-to-hash mapping information and the H2D tables are utilized to store hash-to-data mapping information, in support of mapping of logical addresses for respective pages to corresponding physical addresses for those pages via respective hashes or other types of content-based signatures, as described in further detail elsewhere herein. The control modules 108C-1 through 108C-x further comprise corresponding instances of scanning and recovery control logic 206C-1 through 206C-x that interact with the scanning and recovery control logic 200 of the management module 108M to support scanning and recovery of internal hash metadata structures as disclosed herein.

The control modules 108C may further comprise additional components not explicitly shown in FIG. 2, such as respective messaging interfaces that are utilized by the control modules 108C to generate control-to-routing messages for transmission to the routing modules 108R, and to process routing-to-control messages received from the routing modules 108R. Such messaging interfaces can also be configured to generate messages for transmission to the management module 108M and to process instructions and other messages received from the management module 108M.

The data modules 108D-1 through 108D-y in the FIG. 2 embodiment comprise respective control interfaces 210D-1 through 210D-y. These control interfaces 210D support communication between the data modules 108D and corresponding ones of the control modules 108C. Also included in the data modules 108D-1 through 108D-y are respective SSD interfaces 212D-1 through 212D-y. These SSD interfaces 212D support communications with corresponding ones of the storage devices 106.

Figure 3:
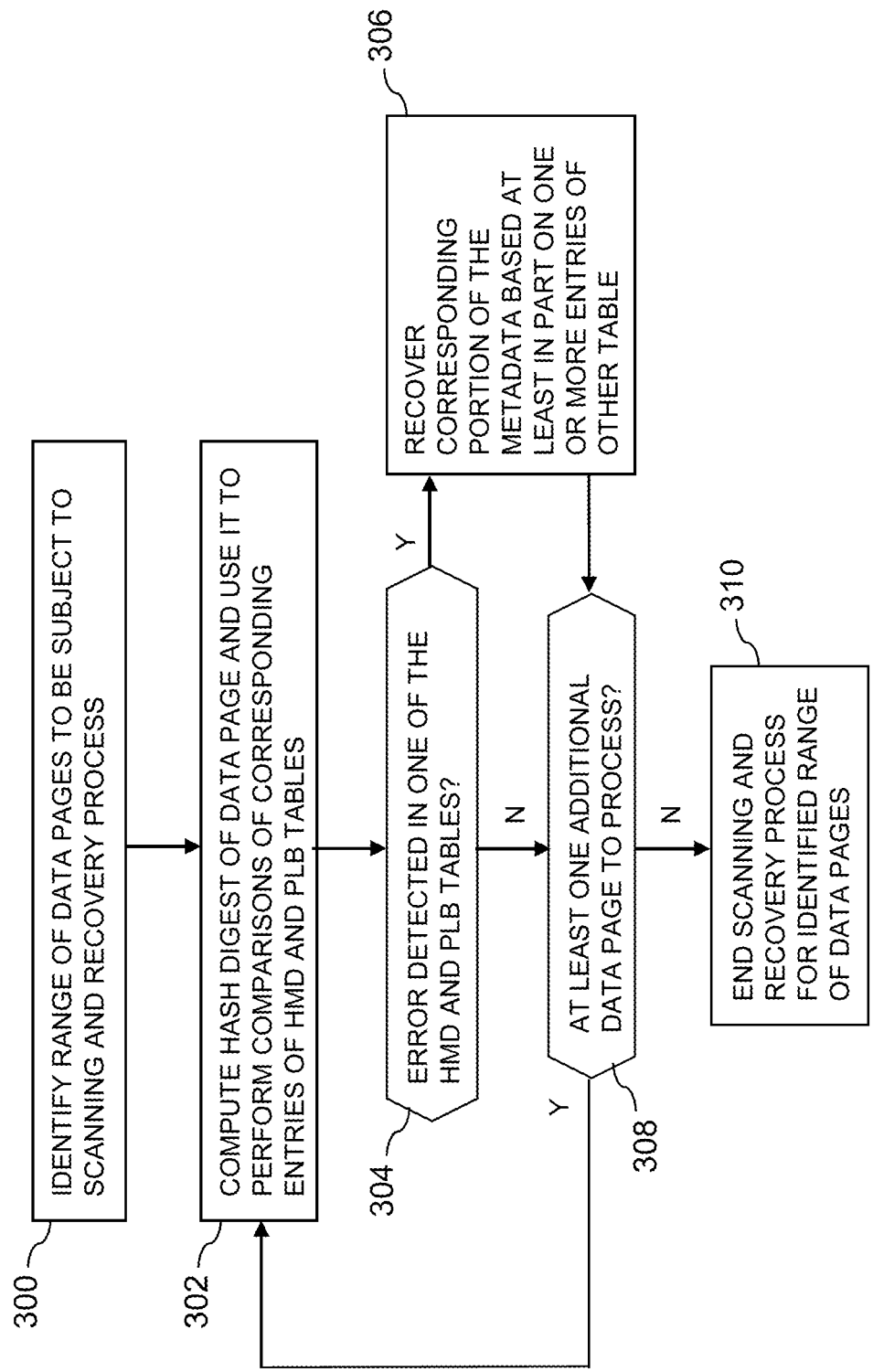
FIG. 3 is a flow diagram showing a process for scanning and recovery of internal hash data structures in an illustrative embodiment.

The operation of the information processing system 100 will now be described in further detail with reference to the flow diagram of FIG. 3. The flow diagram of FIG. 3 illustrates a set of processing operations implementing functionality for scanning and recovery of internal hash metadata structures in a content addressable storage system. The process includes steps 300 through 310, and is suitable for use in system 100 but is more generally applicable to other types of systems in which it is desirable to provide recovery from detected metadata errors. The steps of the flow diagram are illustratively performed at least in part under the control of a storage controller of a storage system, such as the distributed storage controller 108 of content addressable storage system 105.

In step 300, a range of data pages to be subject to the scanning and recovery process are identified. This identification is illustratively performed by a system-wide manager of a distributed storage controller in a clustered storage system. The system-wide manager illustratively comprises SYM module 108M of storage controller 108 in the content addressable storage system 105, although other types of system-wide managers can be used, and such managers can be implemented on a single node of the clustered storage system or distributed across multiple nodes of the clustered storage system.

In step 302, a hash digest of the data page is computed and used to perform comparisons involving corresponding entries of the HMD and PLB tables. The hash digest is illustratively computed by applying a secure hashing algorithm such as SHA1 to the content of the data page. The resulting hash digest is also referred to herein as a full hash digest, and represents a unique content-based signature of the data page, such that any other data pages with exactly the same content will have exactly the same hash digest.

As mentioned previously, examples of the HMD and PLB tables are shown in FIGS. 4A and 4B respectively.

Referring initially to FIG. 4A, an HMD table 400 in this illustrative embodiment comprises a plurality of entries accessible utilizing unique hash identifiers denoted Unique Hash ID 1, Unique Hash ID 2, . . . Unique Hash ID M as respective keys. Each of such entry of the HMD table 400 comprises a corresponding one of the unique hash identifiers, a corresponding reference count and a corresponding physical offset of one of the data pages. A given one of the reference counts denotes the number of logical pages that have the same content as the corresponding data page and therefore point to that same data page via their hash digests.

FIG. 4B shows a PLB table 402 that in this illustrative embodiment comprises a plurality of entries accessible utilizing physical offsets denoted Physical Offset 1, Physical Offset 2, . . . Physical Offset P as respective keys, with each such entry of the PLB table 402 comprising a corresponding one of the physical offsets, a corresponding one of the hash digests, and a corresponding one of the unique hash identifiers.

As indicated above, the unique hash identifiers are generally shorter in length than the corresponding hash digests of the respective data pages, and each illustratively provides a unique short representation of the corresponding full hash digest. In some embodiments, the unique hash identifiers may comprise respective "hash handles" of the data pages with the hash handles uniquely corresponding to respective ones of the hash digests. Other types of unique hash identifiers can be used in other embodiments.

Also, it is to be appreciated that terms such as "table" and "entry" as used herein are intended to be broadly construed, and the particular example table and entry arrangements of FIGS. 4A and 4B can be varied in other embodiments. For example, additional or alternative arrangements of entries can be used.

The remaining portion of the FIG. 3 process will now be described.

In step 304, a determination is made as to whether or not an error is detected in one of the HMD and PLB tables. If an error is detected, the process moves to step 306, and otherwise moves to step 308 as shown.

In step 306, the corresponding portion of the metadata that is in error in the HMD table or the PLB table is recovered based at least in part on one or more entries of the other table. More particularly, if there is an error detected in the HMD table, the corresponding portion of the metadata that is in error is recovered using one or more entries of the PLB table. Similarly, if there is an error detected in the PLB table, the corresponding portion of the metadata that is in error is recovered using one or more entries of the HMD table. The data page itself and its computed hash digest may additionally be used in recovering the corresponding portion of the metadata responsive to the detected error.

Steps 304 and 306 are therefore configured to determine if one or more entries of the HMD table or the PLB table are missing, inconsistent or otherwise in error, and to restore any such erroneous entries using corresponding correct entries from the other table and possibly also the data page itself and its computed hash digest.

In step 308, a determination is made as to whether or not there is at least one additional data page to process in the identified range of data pages. If there is at least one additional data page to be processed, the process returns to step 302 to repeat that step and any applicable subsequent steps for another data page remaining in the identified range of data pages. If there are no additional data pages to be processed in the identified range of data pages, the process moves to step 310.

In step 310, the scanning and recovery process is ended for the identified range of data pages. The process can then be restarted for a different range of data pages. Additionally or alternatively, the process can be periodically repeated for the same identified range of data pages. Numerous alternative arrangements are possible.

A scanning and recovery process such as that illustrated in FIG. 3 can be implemented in some embodiments as a utility process that is executed periodically or under other conditions by the storage system. For example, the scanning and recovery can be applied to an entire storage system that is taken offline for the process. As another example, the process can be executed while the storage system is online with appropriate locking of data pages and their associated metadata entries as the scanning and recovery process executes.

The particular processing operations and other system functionality described above in conjunction with the flow diagram of FIG. 3 are presented by way of illustrative example only, and should not be construed as limiting the scope of the disclosure in any way. Alternative embodiments can use other types of processing operations for scanning and recovery of internal hash metadata structures in a content addressable storage system. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to handle multiple page ranges and associated metadata within a given storage system.

Functionality such as that described in conjunction with the flow diagram of FIG. 3 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

A storage controller such as distributed storage controller 108 that is configured to control performance of one or more steps of the process of the flow diagram of FIG. 3 in system 100 can be implemented as part of what is more generally referred to herein as a processing platform comprising one or more processing devices each comprising a processor coupled to a memory. A given such processing device may correspond to one or more virtual machines or other types of virtualization infrastructure such as Docker containers or Linux containers (LXCs). The host devices 102 and content addressable storage system 105 of system 100, as well as other system components, may be implemented at least in part using processing devices of such processing platforms. For example, in the distributed storage controller 108, respective distributed modules can be implemented in respective containers running on respective ones of the processing devices of a processing platform.

Illustrative embodiments of storage systems with functionality for scanning and recovery of internal hash metadata structures as disclosed herein can provide a number of significant advantages relative to conventional arrangements.

For example, some embodiments provide content addressable storage systems and other types of clustered storage systems that are configured to detect and correct errors in metadata structures without the need to rely on log-based approaches that are limited in their history, coverage and capacity and therefore their recovery success probability.

Some embodiments can effectively guarantee that a particular internal hash metadata structure of one type that is found to be inconsistent or otherwise defective can be recovered utilizing a different internal hash metadata structure of a second type, and vice-versa. Accordingly, illustrative embodiments can provide a very high recovery success probability for internal metadata errors.

Moreover, illustrative embodiments can recover from metadata losses of any size without history, coverage or capacity restrictions. For example, losses of small amounts of metadata in a given metadata table can be recovered, or substantially the entire metadata table can be reconstructed.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for scanning and recovery of internal hash metadata structures will now be described in greater detail with reference to FIGS. 5 and 6. Although described in the context of system 100, these platforms may also be used to implement at least portions of other information processing systems in other embodiments.

Figure 5:
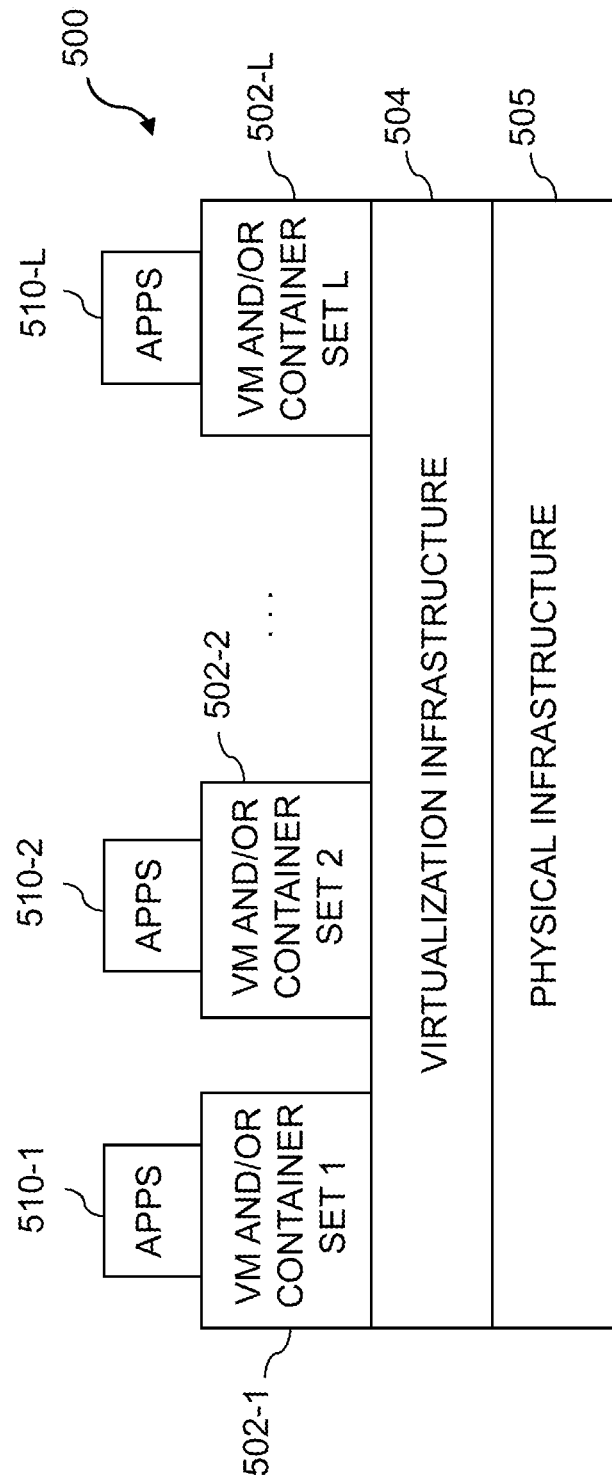
FIGS. 5 and 6 show examples of processing platforms that may be utilized to implement at least a portion of an information processing system in illustrative embodiments.
Figure 6:
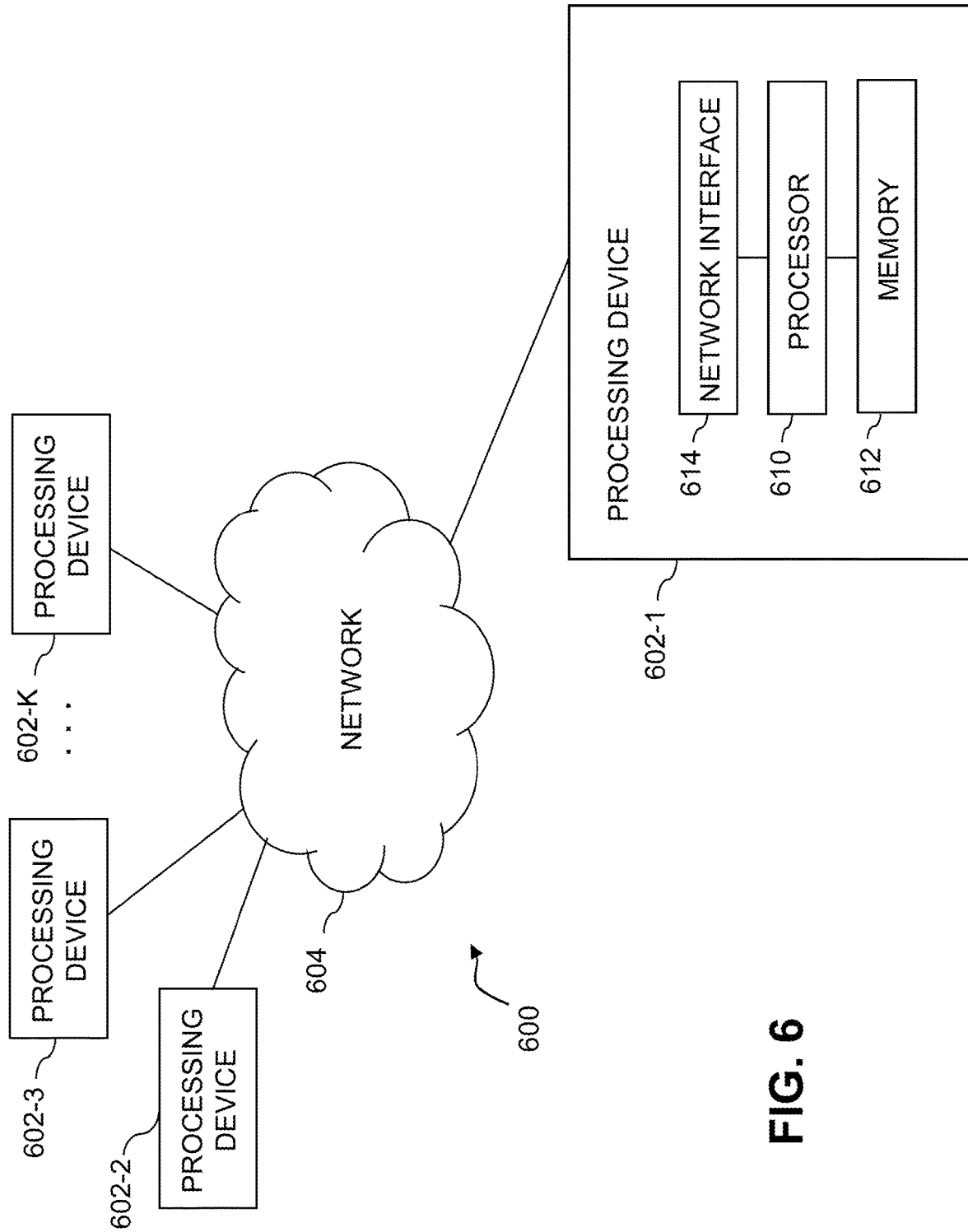

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. Such implementations can provide storage functionality of the type described above for one or more processes running on a given one of the VMs.

An example of a hypervisor platform that may be used to implement a hypervisor within the virtualization infrastructure 504 is the VMware® vSphere® which may have an associated virtual infrastructure management system such as the VMware® vCenter™. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system. Such implementations can provide storage functionality of the type described above for one or more processes running on different ones of the containers. For example, a container host device supporting multiple containers of one or more container sets can implement one or more instances of the FIG. 3 process for scanning and recovery of internal hash metadata structures.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the storage functionality of one or more components of a host device or storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage nodes, storage devices, storage controllers, scanning and recovery processes and associated control logic. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
a storage system comprising a plurality of storage devices and a storage controller;
the storage controller being configured:
to scan data pages and associated metadata structures of the storage system, the metadata structures comprising at least a first metadata structure associating unique hash identifiers with physical locations of respective data pages in the storage system and a second metadata structure associating the physical locations of respective data pages with hash digests of the data pages and the unique hash identifiers;
to detect an error in one of the first and second metadata structures; and
responsive to the detected error, to recover a corresponding portion of the metadata based at least in part on one or more entries of the other one of the first and second metadata structures;
wherein the storage controller comprises at least one processing device comprising a processor coupled to a memory.

2. The apparatus of claim 1 wherein the first metadata structure comprises a first metadata table, the first metadata table comprising a plurality of entries accessible utilizing the unique hash identifiers as respective keys, with each such entry of the first metadata table comprising a corresponding one of the unique hash identifiers, a corresponding reference count and a corresponding physical offset of one of the data pages.

3. The apparatus of claim 1 wherein the second metadata structure comprises a second metadata table, the second metadata table comprising a plurality of entries accessible utilizing physical offsets of the physical locations as respective keys, with each such entry of the second metadata table comprising a corresponding one of the physical offsets, a corresponding one of the hash digests, and a corresponding one of the unique hash identifiers.

4. The apparatus of claim 1 wherein the unique hash identifiers are shorter in length than the corresponding hash digests of the respective data pages.

5. The apparatus of claim 4 wherein the unique hash identifiers comprise respective hash handles of the data pages with the hash handles uniquely corresponding to respective ones of the hash digests.

6. The apparatus of claim 1 wherein the storage controller is further configured to initiate the scanning of the data pages and the metadata structures responsive to a metadata loss event.

7. The apparatus of claim 1 wherein the storage controller is further configured to scan the data pages and the metadata structures by:
identifying a range of data pages to be scanned;
for each of the data pages in the identified range:
computing a hash digest of the page;
utilizing the computed hash digest to identify a corresponding entry of the first metadata structure;
executing a first comparison of an actual physical location of the page with the corresponding entry of the first metadata structure;
executing a second comparison of the computed hash digest of the page to a corresponding entry of the second metadata structure;
wherein an error in the first metadata structure is indicated by an inconsistency between the actual physical location of the page and the corresponding entry of the first metadata structure in the first comparison; and
wherein an error in the second metadata structure is indicated by an inconsistency between the computed hash digest of the page and the corresponding entry of the second metadata structure in the second comparison.

8. The apparatus of claim 7 wherein responsive to detection of an error in the first metadata structure, the corresponding entry of the first metadata structure is recovered at least in part by:
obtaining the unique hash identifier from the second metadata structure; and
generating an updated entry based at least in part on the unique hash identifier.

9. The apparatus of claim 7 wherein responsive to detection of an error in the second metadata structure, the corresponding entry of the second metadata structure is recovered at least in part by:
obtaining the unique hash identifier from the first metadata structure; and
generating an updated entry based at least in part on the unique hash identifier and the computed hash digest.

10. The apparatus of claim 1 wherein the hash digests are computed by applying a secure hashing algorithm to content of the respective data pages.

11. The apparatus of claim 1 wherein the storage system is implemented in the form of a clustered storage system comprising a plurality of nodes, each of at least a subset of the nodes comprising:
a processor coupled to a memory; and
a set of processing modules configured to communicate over one or more networks with corresponding sets of processing modules on other ones of the nodes.

12. The apparatus of claim 11 wherein the sets of processing modules collectively comprise at least a portion of a distributed implementation of the storage controller of the storage system.

13. The apparatus of claim 11 wherein at least one of the sets of processing modules comprises at least one system-wide management module implemented on a corresponding one of the nodes.

14. The apparatus of claim 11 wherein the sets of processing modules of at least a subset of the nodes each comprise at least one control module and at least one data module, with different portions of a logical address space of the storage system being assigned to different ones of the control modules, each of the control modules being configured to direct received write requests to particular ones of the data modules for storage of corresponding data pages in particular ones of the storage devices.

15. A method comprising:
    scanning data pages and associated metadata structures of a storage system, the metadata structures comprising at least a first metadata structure associating unique hash identifiers with physical locations of respective data pages in the storage system and a second metadata structure associating the physical locations of respective data pages with hash digests of the data pages and the unique hash identifiers;
    detecting an error in one of the first and second metadata structures; and
    responsive to the detected error, recovering a corresponding portion of the metadata based at least in part on one or more entries of the other one of the first and second metadata structures;
    wherein the method is implemented by at least one processing device comprising a processor coupled to a memory.

16. The method of claim 15 wherein the first metadata structure comprises a first metadata table, the first metadata table comprising a plurality of entries accessible utilizing the unique hash identifiers as respective keys, with each such entry of the first metadata table comprising a corresponding one of the unique hash identifiers, a corresponding reference count and a corresponding physical offset of one of the data pages.

17. The method of claim 15 wherein the second metadata structure comprises a second metadata table, the second metadata table comprising a plurality of entries accessible utilizing physical offsets of the physical locations as respective keys, with each such entry of the second metadata table comprising a corresponding one of the physical offsets, a corresponding one of the hash digests, and a corresponding one of the unique hash identifiers.

18. A computer program product comprising a non-transitory processor-readable storage medium having stored therein program code of one or more software programs, wherein the program code when executed by at least one processing device causes said at least one processing device:
    to scan data pages and associated metadata structures of a storage system, the metadata structures comprising at least a first metadata structure associating unique hash identifiers with physical locations of respective data pages in the storage system and a second metadata structure associating the physical locations of respective data pages with hash digests of the data pages and the unique hash identifiers;
    to detect an error in one of the first and second metadata structures; and
    responsive to the detected error, to recover a corresponding portion of the metadata based at least in part on one or more entries of the other one of the first and second metadata structures.

19. The computer program product of claim 18 wherein the first metadata structure comprises a first metadata table, the first metadata table comprising a plurality of entries accessible utilizing the unique hash identifiers as respective keys, with each such entry of the first metadata table comprising a corresponding one of the unique hash identifiers, a corresponding reference count and a corresponding physical offset of one of the data pages.

20. The computer program product of claim 18 wherein the second metadata structure comprises a second metadata table, the second metadata table comprising a plurality of entries accessible utilizing physical offsets of the physical locations as respective keys, with each such entry of the second metadata table comprising a corresponding one of the physical offsets, a corresponding one of the hash digests, and a corresponding one of the unique hash identifiers.

* * * * *